Jan. 6, 1925.  
P. D'H. DRESSLER  
RECUPERATOR  
Original Filed June 18, 1920  
1,522,000
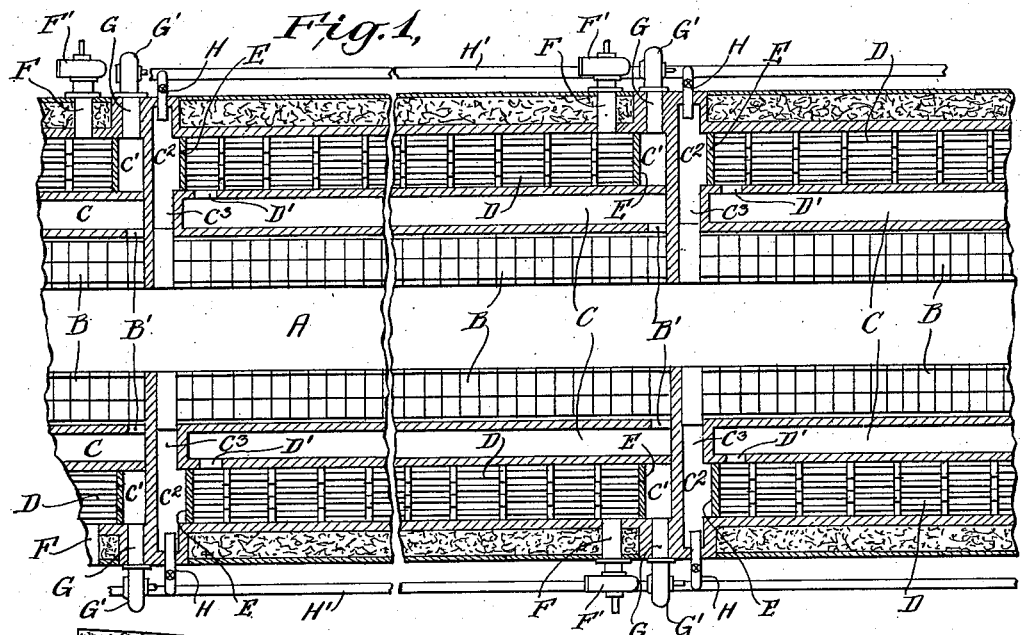
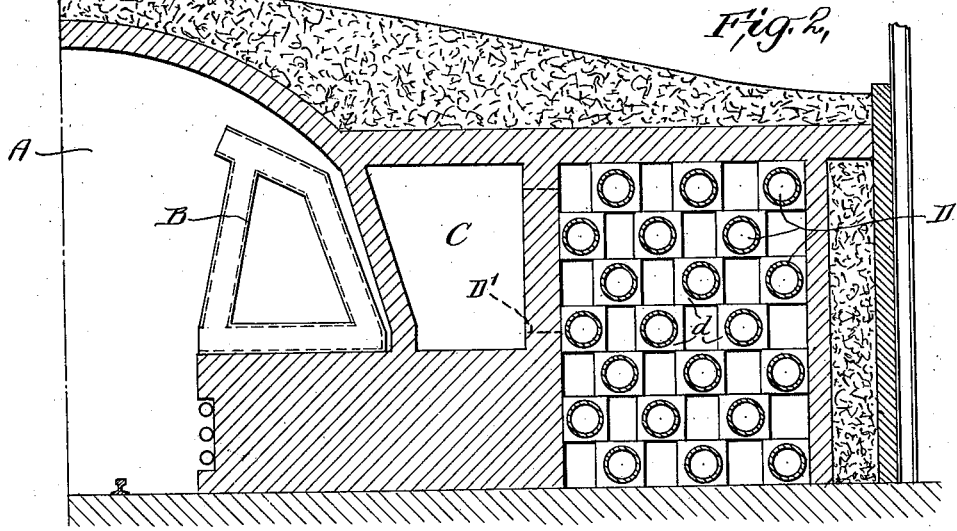
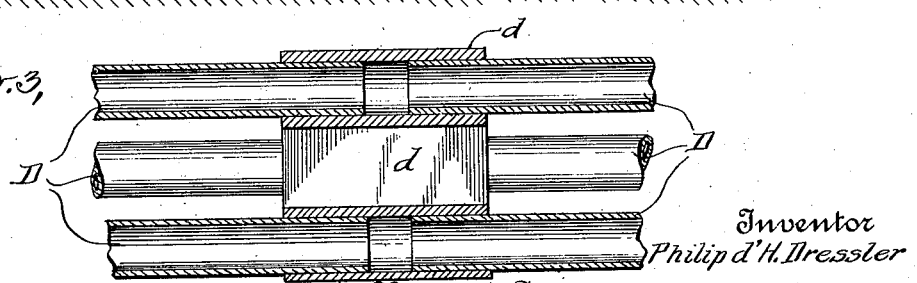
Inventor  
Philip d'H. Dressler  
By his Attorney  
John E. Hubbell Patented Jan. 6, 1925.

1,522,000

UNITED STATES PATENT OFFICE.

PHILIP D'H. DRESSLER, OF CLEVELAND, OHIO, ASSIGNOR TO AMERICAN DRESSLER TUNNEL KILNS, INC., OF NEW YORK, N. Y., A CORPORATION OF NEW YORK.

RECUPERATOR.

Application filed June 18, 1920, Serial No. 389,837. Renewed May 31, 1924.

*To all whom it may concern:*

Be it known that I, PHILIP D'H. DRESSLER, a subject of the King of Great Britain, and resident of Cleveland, in the county of Cuyahoga and State of Ohio, have invented certain new and useful Improvements in Recuperators, of which the following is a specification.

The general object of the present invention is to provide an improved construction of recuperator for utilizing the heat in the escaping products of combustion from a furnace in preheating the air supplied to the furnace to maintain combustion therein.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of the invention.

Of the drawings;

Fig. 1 is a somewhat diagrammatic sectional plan of a portion of a tunnel kiln provided with my improved recuperators;

Fig. 2 is a partial transverse section of a kiln shown in Fig. 1;

And Fig. 3 is a partial vertical section taken at right angles to Fig. 2.

In the drawings I have illustrated the use of my invention in connection with a continuous tunnel kiln A forming the subject matter of my application, Serial No. 369414 filed March 27, 1920, of which the present application is a division. The kiln A shown in the drawings comprises an elongated kiln chamber with an end to end series of combustion chambers B at each side of the pathway through the kiln chamber for the goods to be heated. Associated with each combustion chamber B is a corresponding recuperator; each recuperator comprises a series of tubes or pipes D which extend lengthwise of the recuperator and open at their opposite ends into chamber C' and $C^2$ through apertured heads E. Between each recuperator and the corresponding combustion chamber B is located a channel or conduit C. This conduit receives products of combustion at one end through the port B' from the corresponding combustion chamber B, and passes these products of combustion through a port D' opening from the opposite end of the channel C into the inter-tube space of the recuperator at the end of the latter immediately adjacent the chamber $C^2$. At the opposite end of the recuperator a passage F forms an outlet from the inter-tube space of the recuperator for products of combustion. This outlet is connected to a suitable draft creating device, shown as an exhaust fan F'. The air to be preheated in the recuperator passes into the chamber C' thru a port or passage G. As shown this air is delivered to the passage G by a blower fan G'. The air passes from the chamber C' to the chamber $C^2$ through the tubes or pipes D. A gas supply nozzle H opens into the chamber $C^2$ being supplied with combustible gas through the main H'. The burning mixture formed in the chamber $C^2$ by the gas supplied by the nozzle H and the air passing through the tubes D, passes through the outlet $C^3$ from the chamber $C^2$ into the adjacent combustion chamber B.

With the described construction it will be apparent that the air passing through the tubes D of the recuperator is heated in its passage by the products of combustion in contact with the outer walls of the tubes and flowing through the horizontally elongated recuperator in a direction counter to that in which the air flows through the tubes D.

The tubes or pipes D may be made of any suitable material such as carborundum, fire clay or iron. Because of its very good heat conducting properties, iron is preferably employed in the recuperator throughout or in the colder end of the recuperator, when the temperatures prevailing in the hot end of the recuperator are so high as to require the tubes in that portion of the recuperator to be made of a more refractory material, such as fire clay or carborundum. Regardless of the material out of which they are made, the tubes D are formed in sections connected by thimbles $d$ into each of which the adjacent ends of an adjacent pair of tube sections D enter and have a sliding fit. The thimbles $d$ in conjunction with the ends of the tube sections entering them, thus form efficient expansion joint connections. The thimbles $d$ are preferably of square or other polygonal outline in transverse section, so that they may be stacked up on one another as shown best in Fig. 2. With the thimbles $d$ thus stacked up at intervals along the length of the recuperator, the tubes D are correctly spaced apart and the tubular structure as a whole is stable. Each stack or pile of thimbles $d$ forms in effect an apertured baffle wall extending transversely across the recuperator chamber and adapted to break up the stream flow lines of the products of combustion through the recuperator, thereby adding to the efficiency of the heat transfer.

While well adapted for use as a part of the tunnel kiln structure shown in the drawings, my improved recuperator structure is obviously not restricted to use in connection with this or any other particular kind of furnace. It will be apparent to those skilled in the art that changes may be made in the form of the preferred construction illustrated without departing from the spirit of my invention as set forth in the appended claims.

Having now described my invention, what I claim as new and desire to secure by Letters Patent, is:

1. In a recuperator, the combination with a plurality of parallel tubes formed in sections, of thimbles each connecting the adjacent ends of an adjacent pair of tube sections and uniting therewith to form expansion joints, and co-operating with other of said thimbles to support the tubes in spaced apart relation.

2. In a recuperator, the combination with a plurality of parallel tubes formed in sections, of thimbles each connecting the adjacent ends of an adjacent pair of tube sections and uniting therewith to form expansion joints, and co-operating with other of said thimbles to support the tubes in spaced apart relation, said thimbles being of polygonal outline in transverse section.

3. In a recuperator, the combination with a plurality of parallel tubes formed in sections of thimbles each connecting the adjacent ends of an adjacent pair of tube sections and uniting therewith to form expansion joints and co-operating with others of said thimbles to form an apertured baffle extending transversely to the tubes.

4. In an air heater, the combination with a plurality of parallel tubes formed in sections and a transverse supporting wall for said tubes formed with an aperture for each tube and having the adjacent ends of adjacent sections of the tube inserted in the opposite ends of the aperture.

5. In an air heater, the combination with a plurality of parallel tubes each composed of a similar plurality of sections arranged end to end and with adjacent sections of adjacent tubes of the same length, and transverse tubes supporting walls each formed with an aperture for each tube and having the adjacent ends of adjacent sections of the corresponding tube inserted in the opposite ends of the aperture.

Signed at Detroit, in the county of Wayne and State of Michigan, this 15th day of June, A. D. 1920.

PHILIP D'H. DRESSLER.